United States Patent
Abramson et al.

(10) Patent No.: US 9,570,047 B2
(45) Date of Patent: *Feb. 14, 2017

(54) INTERACTIVE ELECTRONICALLY PRESENTED AREA REPRESENTATION

(71) Applicant: ActiveMap LLC, Brooklyn, NY (US)

(72) Inventors: Michael Abramson, Brooklyn, NY (US); Erika Jakubassa, Brooklyn, NY (US); Michael Grisham, New York, NY (US); Geoff Atkin, Bayside, NY (US)

(73) Assignee: Activemap LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,450

(22) Filed: Aug. 13, 2013

(65) Prior Publication Data

US 2013/0328933 A1 Dec. 12, 2013

Related U.S. Application Data

(63) Continuation of application No. 13/040,910, filed on Mar. 4, 2011, now abandoned, which is a continuation
(Continued)

(51) Int. Cl.
*G01C 21/36* (2006.01)
*G09G 5/14* (2006.01)
(Continued)

(52) U.S. Cl.
CPC ............... *G09G 5/14* (2013.01); *G01C 21/367* (2013.01); *G01C 21/3682* (2013.01);
(Continued)

(58) Field of Classification Search
CPC ........... G06F 17/30241; G01C 21/3679; G01C 21/3682
(Continued)

(56) References Cited

U.S. PATENT DOCUMENTS 4,751,507 A 6/1988 Hama et al.
4,800,379 A 1/1989 Yeomans
(Continued)

FOREIGN PATENT DOCUMENTS

EP 0172368 A2 2/1986
EP 1 091 325 A1 4/2001
(Continued)

OTHER PUBLICATIONS

"What am I Windows for Icons" IBM Technical Disclosure Bulletin, IBM Corp. New York, US, vol. 34, No. 7A, Dec. 1, 1991 (Dec. 1, 1991), p. 459, XP000255675 ISSN:00188689.
(Continued)

*Primary Examiner* — Alvin Tan

(57) ABSTRACT

The present invention provides computerized systems and methods for providing electronically presented interactive area representation, such as a map, and information associated therewith. A user can select text, imagery, or other information presented on the map and associated with one or more items or locations, causing presentation of information relating to the associated one or more items or locations, such as appropriate contact information or a hyperlink to an appropriate Web site. Additionally or alternatively, a user can input or select, based on a query or otherwise, information relating to one or more items or locations associated with text, imagery, or other information presented on the map, causing presentation of an indication of one or more locations of the associated text, imagery, or other information on the map. A magnifier feature allowing internal navigation within the map can be provided. Additionally, animated images can appear to move over the map.

18 Claims, 8 Drawing Sheets

Related U.S. Application Data of application No. 12/474,850, filed on May 29, 2009, now Pat. No. 8,468,464, which is a continuation of application No. 11/199,843, filed on Aug. 8, 2005, now Pat. No. 7,555,725, which is a continuation of application No. 10/136,845, filed on Apr. 30, 2002, now abandoned.

(60) Provisional application No. 60/287,339, filed on Apr. 30, 2001.

(51) Int. Cl.
*G06F 3/0481* (2013.01)
*G06F 17/30* (2006.01)
*G06T 3/00* (2006.01)
*G06T 11/60* (2006.01)
*G09B 29/00* (2006.01)

(52) U.S. Cl.
CPC ........ *G06F 3/0481* (2013.01); *G06F 17/3087* (2013.01); *G06T 3/0018* (2013.01); *G06T 3/0025* (2013.01); *G06T 11/60* (2013.01); *G09B 29/007* (2013.01); *G06F 2203/04805* (2013.01); *Y10S 707/99945* (2013.01); *Y10S 707/99948* (2013.01)

(58) Field of Classification Search
USPC .......................................................... 715/804
See application file for complete search history.

(56) References Cited

U.S. PATENT DOCUMENTS

| | | | |
|---|---|---|---|
| 4,974,170 A | 11/1990 | Bouve et al. | |
| 5,355,376 A | 10/1994 | Cox et al. | |
| 5,369,671 A | 11/1994 | Yehushua et al. | |
| 5,463,726 A | 10/1995 | Price | |
| 5,638,523 A | 6/1997 | Mullet et al. | |
| 5,682,525 A | 10/1997 | Bouve et al. | |
| 5,754,348 A | 5/1998 | Soohoo | |
| 5,790,121 A | 8/1998 | Sklar et al. | |
| 5,802,492 A | 9/1998 | DeLorme et al. | |
| 5,818,455 A | 10/1998 | Stone et al. | |
| 5,875,001 A | 2/1999 | Kwak | |
| 5,930,474 A | 7/1999 | Dunworth et al. | |
| 5,945,985 A | 8/1999 | Babin et al. | |
| 5,946,687 A | 8/1999 | Gehani et al. | |
| 5,966,135 A | 10/1999 | Roy et al. | |
| 5,974,572 A | 10/1999 | Weinberg | |
| 5,987,637 A | 11/1999 | Thomas | |
| 6,018,761 A | 1/2000 | Uomini | |
| 6,144,962 A | 11/2000 | Weinberg et al. | |
| 6,148,260 A | 11/2000 | Musk et al. | |
| 6,154,871 A | 11/2000 | Claydon et al. | |
| 6,184,859 B1 | 2/2001 | Kojima | |
| 6,202,026 B1 | 3/2001 | Nimura et al. | |
| 6,240,360 B1 | 5/2001 | Phelan | |
| 6,307,573 B1 | 10/2001 | Barros | |
| 6,321,158 B1 | 11/2001 | DeLorme et al. | |
| 6,337,693 B1 | 1/2002 | Roy et al. | |
| 6,397,143 B1 | 5/2002 | Peschke | |
| 6,476,831 B1 | 11/2002 | Wirth et al. | |
| 6,525,690 B2 | 2/2003 | Rudow et al. | |
| 6,640,185 B2 | 10/2003 | Yokota et al. | |
| 6,650,998 B1 | 11/2003 | Rutledge et al. | |
| 6,654,506 B1 | 11/2003 | Luo et al. | |
| 6,674,445 B1 | 1/2004 | Chithambaram et al. | |
| 6,691,114 B1 | 2/2004 | Nakamura | |
| 6,724,382 B2 | 4/2004 | Kenyon et al. | |
| 7,007,228 B1 | 2/2006 | Carro | |
| 2001/0045949 A1 | 11/2001 | Chithambaram et al. | |
| 2002/0010850 A1 | 1/2002 | Nelson et al. | |
| 2002/0091758 A1 | 7/2002 | Singh et al. | |
| 2002/0116120 A1 | 8/2002 | Ruiz et al. | |
| 2003/0061211 A1 | 3/2003 | Shultz et al. | |
| 2003/0083073 A1 | 5/2003 | Cossins et al. | |
| 2003/0101237 A1 | 5/2003 | Ban et al. | |
| 2003/0123717 A1 | 7/2003 | Bacus et al. | |
| 2004/0157641 A1 | 8/2004 | Chithambaram et al. | |
| 2007/0229344 A1 | 10/2007 | Meyer et al. | |
| 2010/0034325 A1 | 2/2010 | Abdallah et al. | |

FOREIGN PATENT DOCUMENTS

| | | |
|---|---|---|
| GB | 2258110 A | 1/1993 |
| JP | 337873 | 11/1992 |
| JP | 10-340045 | 12/1998 |
| JP | 11-051666 | 2/1999 |
| JP | 11-281385 | 10/1999 |
| JP | 2000136936 A | 5/2000 |
| JP | 2000-180194 A | 6/2000 |
| JP | 20001934640 | 7/2000 |
| WO | WO-97/07467 A1 | 2/1997 |
| WO | WO-98/43105 A2 | 10/1998 |
| WO | WO-99/59086 A1 | 11/1999 |
| WO | WO 00/49532 | 8/2000 |
| WO | WO-00/68822 A2 | 11/2000 |
| WO | WO-01/08053 A2 | 2/2001 |
| WO | WO-01/27812 A2 | 4/2001 |
| WO | WO-01/55831 A1 | 8/2001 |
| WO | WO-01/90923 A2 | 11/2001 |

OTHER PUBLICATIONS

Harris C.B. et al., "Digital Map Dependent Functions of Automatic Vehicle Location Systems" Nov. 29, 1988; Nov. 29, 1988-Dec. 2, 1988, Nov. 29, 1988 (Nov. 29, 1988), pp. 79-87, XP010078747.

European Office Action dated Apr. 8, 2010, 7 pgs. in European Appln. No. EP02729080.8.

Manual for "Age of Empires" interactive electronic game © 1997.

Manual for "StarCraft" interactive electronic game © 1998.

Manual for "Starcraft" interactive electronic game, Copyright 1998, Blizzard Entertainment.

Starcraft Screenshots, Blizzard Entertainment, 1998, figures 1-4.

PCWorld, "Get Lost (and Found) With AM Map'n'Go 6.0" Aug. 10, 2000, PCWorld, Available http://www.pcworld.com/articie/17998/getJost_and_found_with_aaa_rnapngp_6.0.htrnl.

Delorme, "XMap Business CD Overview," Aug. 15, 2000, Delorme, Available http://web.archive.org/web/20000815075220/http://www.delorme.com/xmapl.

WildTangent Corporate, "WildTangeant and ESRI to Create Internet Mapping Applications,"Jun. 30, 2000, WildTangent, Inc., Available http://www.wildtangent.com/Corporate/gwildtangent-and-esri-to-create-interne t-mapping-applications.

WildTangent Corporate, "WildTangent Puts a New Face on Internet Mapping," Feb. 20, 2001, VVildTangent, Inc., Available http://www.wildtangent.com/Corporate/wildtangent-puts-a-new-face-on-int ernet-mapping/.

"Software Review for BackOffice Zenrin Electronic Map [zi:] for Businessmen all Japan Edition", BackOffice World, IDG Comm., Inc., Mar. 1, 1999, vol. 2, No. 3 (3 pgs) (partial, unofficial translation provided) (3 pages).

www.expediamaps.com printed from http://webarchive.org/web/1999022106192; www.expediamaps.com/hm_contents.asp; original dated 1999 (3pgs).

www.mapquest.com printed from http://web.archive.org/web/199990429055843 http://www.mapquest.com/; original dated 1999 (1 pg).

New Products Review—ProAtlas 2000 Sep. 9, 1999 (1 pg. plus 2 pages of; translation).

BIGLOBE/NEC Advertisement; dated 1999 (1 page plus 2 pages of; translation).

www.excite.com.Feb. 19, 2001.

www.maps.com Apr. 27, 1999, printed using the WaybackMachlne Internet Archive.

Adballah et al., Low-Power Pre-Decoding Based Viterbi Decoder for Tail-Biting Convolutional Codes,, Signal Processing Systems, IEEE p. 185-190, Oct. 7-9, 2009.

(56) References Cited

OTHER PUBLICATIONS

Chu et al., "Power Efficient Low Latency Survivor Memory Architecture for Viterbi Decoder," VLSI Design, Automation and Test, IEEE, p. 228-231, Apr. 23-25, 2008.

Gang et al., "An Efficient Pre-Traceback Approach for Viterbi Decoding in Wireless Communication," IEEE 3 Transactions on Circuits and Systems-I: Regular Papers, vol. 53, No. 9, p. 5441-5444, Sep. 2006.

Manzoor et al., "VLSI Implementation of an Efficient Pre-Trace Back Approach for Viterbi Algorithm," Proceedings of International Bhurban Conference on Applied Sciences & Technology Islamabad, Pakistan, p. 27-30, Jan. 8-11, 2007.

Shaker et al.,"FPGA Implementation of a Reconfigurable Viterbi Decoder for WiMAX Receiver", 2009 Microelectronics (ICM), 2009 International Conference, IEEE, p. 264-267, Dec. 19-22, 2009.

Min et al., "Research on an-based Decode of Tail-Biting Convolutional Codes and Their Performance Analyses Used in L TE System", Information Technology and Applications, IEEE, p. 303-306, vol. 2, May 15-17, 2009.

Liu et al., "Trellis Lengths and Truncation Depths for TBCC Decoders in Mobile WiMAX", Intelligent Signal Processing and Communication Systems, IEEE, p. 5-8, Jan. 7-9, 2009.

Lin et al., "Design of a Power-Reduction Viterbi Decoder for WLAN Applications ", Circuits and Systems, IEEE, 1148-1156, vol. 52 , Jun. 2005.

Boutillon et al., "High Speed Low Power Architecture for Memory Management in a Viterbi Decoder", 1996 IEEE, p. 284-287.

Wu et al., "VLSI Architecture of Extended In-Place Path Metric Update for Viterbi Decoders", 2001 IEEE, p. IV-206-p. IV-209.

Cox et al.,"An Efficient Adaptive Circular Viterbi Algorithm for Decoding Generalized Tailbiting Convolutional Codes," IEEE Transactions on Vehicular Technology, pp. 57-68, vol. 43, No. 1, Feb. 1994.

IBM Technical Disclosure Bulletin, What am I • Windows for Icons. vol. 34 No. 7, Dec. 1991.

Screen shots of "Map 'n' Go"; 1998; 11 pages.

http://www.cyber-reviews.com/may98.html, "Map 'n' Go 4.0"; 1998; 2 pages.

"Map & Guide 4.0 für Windows"; User Manual; C.A.S Software GmbH; Mar. 1997; 181 pages (German).

Web page from "Tom Tom ESRI GIS & Mapping Software"; Mar. 2001I; 1 page.

Screen shot of Map & Guide; 22 pages.

Web page from "Tom Tom World Gazetteer"; Oct. 2000; 1 page.

"GIS and Location Services on the Web"; An ESRI White Paper; Jun. 2000; 3 pages.

Letter from C.A.S Software regarding Map & Guide 4.0; Jun. 26, 1997; 1 page. (German).

Advertisement for Map & Guide 4.0 i German; PC Magazine; Jul. 31, 1997; 2 pages (German).

Article titled "Map & Guide 4.0: Der neue MaBstab, German"; PC Magazine; Mar. 1997; 4 pages (German).

Product description with CD Titled, "Eine Begegnung mit Map & Guide 4.0 Die neue Generation"; CASXPRESS special; Mar. 1997; 9 pages (German).

Advertisement in Computerwoche 40, "CeBIT'97 CAS Software Elektronische Urlaubsplanung mit Map & Guide"; Mar. 14, 1997; 1 page. (German).

Screen shot "Routenplanung"; Mar. 11, 1997; 1 page (German).

Product literature and CD for Map & Guide 4.0 City; PC Mobil Magazine; 1997; 4 pages; (German).

"Trip planning easier with map software"; The Augusta Chronicle; Nov. 1, 1998; 3 pages (German).

http://groups.google.com/forum, "Travel planning software"; Apr. 20, 1999; 1 page.

http://www.tcs.org/ioport/jul98/deal798.html, "From the Deals Guy"; I/O Port Newsletter; Jul. 1998; 5 pages.

http://www.highbeam.com/doc/1G1, "Map'n'Go and TripMaker Will Point You in the Right Direction"; HighBeam Research; Feb. 1, 1999; 1 page.

http://www.thefreelibrary.com, "DeLorme's New AAA Map'n'Go 4.0 Takes Family Fun on the Road"; Apr. 1998; 1 page.

Semco Data Bus Newsletter; Official Newsletter SouthEastern Michigan Computer Organization; Jul. 1998; vol. 24; No. 7; pp. 1, 15 and 16.

"Map and Route"; Power Point; Nov. 24, 2000; 19 pages; German.

1565,391,84,108 www.baruch.cuny.edu Baruch College : Schools 17 Lexington Ave. NYC Ph. (212)802-2893 Fx. (212)802-2892
890,274,61,85 www.officepros.com/city/ City Stationers : Shops 20 W. 22nd St. NYC 10003 Ph. (212)675-0724 Fx. (212)727-8566
530,81,60,67 www.usps.gov US Post Office : City Agencies W. 35th St. New York, NY
1000,356,69,97 www.cloneachrome.com Clone A Chrome : Imaging 15 W. 20th St. NYC 10011 Ph.(212)206-1644
927,372,63,135 www.fusebox.com Fusebox : Shops 36 W. 20th St. NYC 10011 (212)929-7644
996,248,61,67 www.lieberman-labs.com Ken Lieberman Labs : Imaging 118 West 22nd St. NYC 10011 (212)633-0500
1314,444,95,45 www.burnettgroup.com The Burnett Group : Design Firms 39 E. 20th St. NYC 10003 Ph. (212)254-3344
890,274,61,85 www.officepros.com/city/ City Stationers : Shops 20 W. 22nd St. NYC 10003 Ph. (212)675-0724 Fx. (212)727-8566

FIG. 2

INTERACTIVE ELECTRONICALLY PRESENTED AREA REPRESENTATION

RELATED APPLICATIONS

This application is a continuation, and claims the priority, of application Ser. No. 13/040,910 filed Apr. 4, 2011, which is a continuation of application Ser. No. 12/474,850 filed May 29, 2009, now U.S. Pat. No. 8,468,464, which is a continuation of application Ser. No. 11/199,843, filed Aug. 8, 2005, now U.S. Pat. No. 7,555,7251, which is a continuation of application Ser. No. 10/136,845 filed Apr. 30, 2002, now abandoned, which claims the priority of provisional application No. 60/287,339, filed Apr. 30, 2001. The entire disclosures of all of the applications identified above are incorporated herein by reference.

COPYRIGHT NOTICE

A portion of the disclosure of this patent document contains material that is subject to ID copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to electronic presentation and use of maps and other area representations (including geographic and non-geographic areas), and related information, and to the interactive use thereof. The presentations may be provided to users via any type of communications or computer network (including wired and/or wireless), such as an intranet, LAN, WAN or the Internet, an system including interactive television, or may be provided in local storage, e.g., in a client or server hard disk or CD, etc.

Electronically presented maps are available over the Internet. See, for example, www.mapquest.com, www.mapsonus.com, www.maps.expedia.com, www.maps.yahoo.com (accessed through www.yahoo.com), www.maps.com, www.maps.excite.com, (accessed through www.excite.com), www.mapblast.com, and www.zip2.com. Also see U.S. Pat. Nos. 4,974,170, 5,682,525 and 6,148,260. A magnifier feature that facilitates use of an electronically presented map is disclosed, for example, in U.S. Pat. No. 5,818,455. U.S. Pat. No. 4,800,379 also discloses use of a magnifier in connection with display of an image.

SUMMARY OF THE INVENTION

The present invention provides computerized systems and methods for providing an electronically presented interactive area representation, such as a map, and information associated therewith. In some embodiments, a user can select text, imagery, or other information presented on the map and associated with one or more items or locations, causing presentation of information relating to the associated one or more items or locations, such as appropriate contact information or a hyperlink to an appropriate Web site. Additionally or alternatively, a user can input or select, based on a query or otherwise, information relating to one or more items or locations associated with text, imagery, or other information presented on the map, causing presentation of an indication of one or more locations of the associated text, imagery, or other information on the map. In some embodiments, internal navigation within the map can be provided using a magnifier that highlights, indicates, or otherwise defines a portion of the map, causing a simultaneous magnified presentation of the defined portion to be provided, which magnifier can be moved smoothly over the map. In some embodiments, animated images can be presented to appear to move over the map and can simultaneously appear to move through magnified presentations. In some embodiments, the animated images can include advertisements which can be related or unrelated to items or locations associated with text, imagery, or other information presented on the map.

The invention provides improvement in the presentation and ease of use of electronically presented maps and other area representations, and information provided by and in association therewith. "Map" and "area representation" are used herein in a broad sense and may encompass a variety of geographic and non-geographic areas. The invention presents information in the area representation itself as well as other information associated with the area representation, provides a unique format for electronically presenting and interactively using an area representation, and uniquely associates information and area representation locations and/or parts. In some embodiments, the area representation represents a site and the item information relates to locations within the site, or a virtual area, or a printed page, etc. Discussion of the invention in connection with a map is illustrative of other area representation applications.

In a preferred embodiment, the invention enables users to obtain information about an area, such as a neighborhood, community, village or city, etc., represented by an electronically presented map, in an easy and enjoyable manner, similar in essence to actually walking through the area of interest.

Maps and other area representations may be provided in accordance with the invention over a network (including wired and/or wireless), e.g., an open or closed network, or locally, e.g., on a CD or diskette or loaded into local hard drive or electronic memory.

The invention provides, e.g., digital signals from which an area representation can be electronically displayed, and digital signals representing associated information, such as text, related in some way to at least one of the locations of the area representation. Sets of digital signals representing supplementary or additional information such as text words, phrases, images, or their combination at least partly containing text, words, images, or characters, etc. are associated with respective location information corresponding to respective locations of the area representation when displayed. Thereby, information associated with a location of an area representation can be displayed based on the location's location information, and location information can be obtained based on associated supplementary or additional information. The digital signals and information may be stored in one or more databases including relationship between and among digital signals and information. Supplementary information, additional information and item information can include voice information, which can be presented, for example, through speakers.

The location information can be obtained from the input of a position indicator device such as a mouse, digitizer, touch screen, touch pad, keyboard, voice recognition system, etc. Associating location information obtained from a position indicator with supplementary or additional information allows the information to be accessed from the location information, and also allows the position indicator to be positioned at a location on a displayed area representation related to the associated information. This may be done on a static or dynamic basis, e.g., when a position indicator is in a fixed location or while it is moving.

The invention in one of its aspects provides two-way interactivity, i.e., associated text or other information can be accessed from location-related information, and a desired location on an area representation can be identified from text or other information. The two-way interactivity thereby allows a user to take advantage of a displayed area representation as well as information available through the system about items associated with locations on the area representation.

For an area representation embodied by a map, placing the position indicator on a desired location on the displayed map can be used to display associated information, and entering or selecting displayed information, image or images, text, or characters can be used to position the position indicator on the map at a location related to the entered or displayed information, image or images, text, or characters.

The invention also provides a magnifier feature which can be used with the area representation and/or the text. In one implementation, digital signals are provided representing two versions of an area representation, which when displayed provide a smaller, or unmagnified, version and a larger, or magnified, version of at least a portion of the area representation. The magnifier feature highlights or otherwise defines the portion of the smaller version of the area representation, and software associates locations on the two area representations and provides a display of the smaller, or unmagnified, version, or view, of the area representation with a highlighted or otherwise defined portion and, simultaneously, a magnified version, or magnified view, of the smaller, highlighted portion.

A location on either or both versions of the area representation is related to supplementary or additional information and text as described above.

The invention in a preferred embodiment displays a composite view of a smaller area representation, a portion of the area representation enlarged or magnified, and associated text information.

The invention in another aspect provides moving images in association with an area representation and the magnifier feature. Separate scripts are used to move the respective images relative to the respective smaller and larger versions of the area representation. The images are relatively scaled in generally the same proportion as the two versions of the area representations. Movement of the images is tracked along corresponding paths on respective area representations. This provides for a smaller version of the image to move relative to the smaller version of the area representation and the larger image to move related to the larger version of the area representation. When a portion of the larger area representation is displayed together with the smaller area representation, the image, e.g., appears to enter the larger version of the area representation synchronized with movement of the image on the smaller area representation. One way to accomplish this is to provide, for each image, lists of points defining movement of the respective image relative to the respective area representation.

The moving images may be implemented in any suitable manner, e.g., using sprites.

In accordance with the invention, an electronic area representation is provided of an area and item information thereon relating to one or more items associated with the area. The item information for different items is at different locations on the area representation. In response to user input selecting item information, additional information relating to the item whose item information was selected is provided, preferably together with the area representation, e.g., on display including the area representation and the additional information. In this embodiment, in which the area representation preferably is a map that represents a geographic area, there is a relationship between the item information and the additional information which is preferably implemented by associating the location of the item information with the related supplementary or additional information.

In another embodiment, the additional information is associated with item information, e.g., via the location of the item information, so that user selection of such additional information provides on the area representation an indication of the item information relating to the selected additional. This embodiment includes a relationship between the item information (e.g., its location) and the additional information which is preferably also implemented by associating the location of the item information with the related supplementary or additional information. In this embodiment and the embodiment described immediately above, the relationship operates in opposite directions.

In still another embodiment, the relationship between item information (e.g., its location on the area representation) and additional information is two-way, i.e., this embodiment includes a relationship between the item information (e.g., its location) and the additional information that operates in both directions. This embodiment thereby provides the two-way or both direction functionality described herein.

In one embodiment, the invention also provides for highlighting a minor portion of the electronic area representation, and providing together with in the electronic area representation a magnified representation of the highlighted portion outside the area representation. The highlighted portion may be positioned on the electronic area representation by means of an input device and moved, preferably, continuously on the electronic display of the area representation.

The invention may provide in some embodiments for moving an image with respect to the area representation including through a highlighted portion and through a magnified representation of the highlighted portion, the image being represented magnified in the magnified portion as compared to the image moved with respect to the area representation.

The invention provides a computer readable medium or media which causes a computer to provide the functionality described herein, and systems and computers and methods, as described herein, that provide such functionality. Preferably, the electronic area representations are presented or displayed on any suitable display device, e.g., a computer monitor or television display device. Selection of item information and additional information may be made by any suitable input device, e.g., computer input devices such as keyboards, pointing devices (mouse, digitizer, touch screen, touch pad, etc.), voice input and recognition devices, etc. User input, as described herein, may also include a query requesting information related to item information on the electronic representation or additional information.

A map embodiment of the invention is described below with the understanding that such description applies where appropriate to other area representations which can be implemented from the disclosure herein by those of skill in the relevant art(s) without undue experimentation.

In a preferred embodiment, the invention associates a map location and/or map part with information ("item information") relating to some place, item, thing or person, which can be real, imaginary, or otherwise, located at or associated with a map location and/or part of the map. "Item information" as used herein is meant in a broad sense, and encompasses information relating to persons, places, sites, items, points of interest, things, objects, etc., (e.g., for business, cultural, architectural, historical, recreational purposes, etc., residences, events, famous or historical persons, persons associated with a business or residence, etc.). (This type of association may also be applied to other area representations.)

Item information may include one or more of the following: a category, name, image, or other identification of a person, place or thing, a physical and/or electronic address thereof, contact information thereof, and information describing the nature or attributes, etc., thereof, at least containing text, characters, or one or more images. The invention provides for associating such information and locations and/or parts of an electronically presented map so that one can obtain a display of the item information interactively from a view of a map, or one can obtain a view of a map, i.e., and relevant part thereof, or map location interactively from the associated item information, or both. This is accomplished by associating each item with coordinate information obtained from data input by a positioning device for a position indicator, so that the coordinate information can be used to retrieve item information, and item information can be used to obtain related coordinate information. Also, a search feature may be provided to identify desired item information and map locations. Thus, in response to a query, e.g., a category query, which query can in some embodiments be input by voice using, for example, a voice recognition device, the search feature provides a list of all item information responsive to the query. The query can also be the name of a specific item, and the response would be a display of the associated item information and positioning of the position indicator at the location on the map of the queried item.

In addition, more sophisticated querying, as known in the art, is possible. For example, in some embodiments, users can execute queries utilizing a search function, search engine, or other search tool, such as a simple word search engine, or a boolean search engine. The search engine can be accessible, for example, from the map or a portion of a display outside the map. In addition, the search engine can be customized to the map, or can be a general search engine, such as any Internet search engine. In some embodiments, the search engine can be used to help provide the user with information useful in specifying appropriate categories, items, or location-related information, to be used in acquiring specific desired information in accordance with the various features of the invention.

Furthermore, in response to a user query, including a voice query input through a voice recognition device, or other user input or selection, submaps can be presented. For example, in some embodiments, a user can query the locations of restaurants in a certain portion of the area representation, and a submap excluding items other than restaurants may be presented. As another example, a user can query the location of restaurants in the entire area representation, and an area representation can be presented to the user that is similar to the originally presented area representation, but which omits items other than restaurants, or upon which restaurants are highlighted or otherwise made obvious, or upon which items other than restaurants are shown in a grayed-out or otherwise less obvious or obtrusive manner.

In some embodiments, a user can query, for example, the location of the nearest restaurant to a presently positioned position indicator on the area representation, in response to which a position indicator such as a magnifier is re-positioned by the system to the nearest restaurant on the area representation. Such embodiments can be implemented, for example, utilizing one or more text or other databases which contain information regarding the nearest items, or nearest items from particular categories, with respect to various map locations, or can be implemented by utilizing programming to calculate distances to items from map locations based on, for example the coordinates of items compared to the coordinates of a location on an area representation, which location can be defined with reference to a position indicator, magnifier, or in some other manner.

The item information is associated with a person, place or thing on, at, near or surrounding a position indicator on an electronic display of a map, e.g., a cursor on a computer monitor that is positionable using an input device such as a mouse, digitizer, keyboard, touchpad or touch screen. For example, item information is displayed correlated to the position on the map of the position indicator.

As discussed above, the invention provides a magnifier feature, or magnifier, which can be one form of position indicator, in conjunction with an electronically displayed area representation to display a selected part of the area representation magnified. Discussion of the magnifier feature in connection with a map is illustrative of other applications.

The map part that is shown magnified may be selected using a position indicator, as described above, on an electronic display of the map. In a preferred embodiment, the magnifier feature highlights or marks in some manner that part of the map which will be displayed magnified. The area highlighted may be a geometric area such as a circle, triangle or rectangle. The area may be highlighted by color, by being darker or lighter than the surrounding area, a line or lines or indicia defining an outline shape, a flashing area or cursor, etc. This highlighted or defined area or map part can be referred to herein as a magnifier or magnifier feature. In the preferred embodiment the shape of the part of the map displayed magnified corresponds to the shape of the magnifier, e.g., circular. Many of the functions of a magnifier can be accomplished by different position indicators, and many of the features of any position indicator can be accomplished by a magnifier. Unless indicated otherwise or from context, the term "position indicator" encompasses a magnifier. Therefore much of the description below regarding a magnifier applies to any position indicator as well, and vice versa. Moreover, in some applications, association of information and location can be used without a magnifier, or a magnifier could be used without association of information and location.

The magnifier may be positioned with respect to a normal or unmagnified presentation of the map in any suitable fashion. (Normal, "unmagnified" and "magnified" are meant in a relative sense. For example, an unmagnified presentation of a map may be a reduced version of a normal size map and vice versa, where by comparison, one map appears magnified). This may be accomplished, for example, by providing scaled versions of maps. For example, movement of the magnifier can be controlled by an input device. The magnifier may also be embodied by an object that is positioned using the cursor and an input device. For example, with a mouse as the input device, the magnifier can be positioned using mouse operations such as "point and click" and "drag and drop". In the preferred embodiment, the magnifier is made of two sprites; one performs a highlighting function, e.g., provides a yellow or other highlighting color to provide a visual definition, and the other provides shape, e.g., to the highlighted area and may be a circular bitmap.

The magnified part of the map may be displayed within a normal or unmagnified presentation of the map, either overlaying the map part to be magnified, or displaced therefrom, or outside of the displayed map part. If the magnified map part is displayed within the map, the position thereof preferably is displaced from the position of the magnifier, and the position of the magnified part changes in accordance with the position of the magnifier. In the preferred embodiment, the magnified map part is displayed outside of the map itself, and a magnifier corresponding in outline shape to the magnified map part, e.g., circular, triangular, rectangular, etc. is shown highlighted and unmagnified. This arrangement permits simultaneous presentation of a highlighted unmagnified map part and the corresponding magnified map part without obscuring any part of the presented map.

In other embodiments of the invention, the magnified map part or magnified view is presented as overlying and obscuring or partially obscuring at least part of the a portion of the unmagnified version highlighted or otherwise defined by the magnifier. For example, the magnified view can be presented as obscuring the entire defined portion. For instance, a magnifier can be implemented as a circle defining the portion of the unmagnified version. The defined portion of the unmagnified version can be obscured and apparently covered by the magnified version, the magnified version showing a magnified view of at least a part of the defined portion. Such an implementation, to a user, gives the an appearance resembling that of a magnifying glass situated above the defined portion of the unmagnified view, and giving a magnified view of at least a part of the defined portion. Alternatively, the magnified version can be displayed so that a part of the unmagnified version appears to cover a part of the unmagnified map, while a remainder of the unmagnified version is displayed "off" of the unmagnified map.

In some embodiments of the invention, the magnifier can be moved in any direction using, for example, a mouse or other pointing device, such that the magnifier appears to move fluidly and smoothly over the unmagnified map, defining ever-changing portions of the unmagnified map, giving an appearance, in some embodiments, resembling physically moving a magnifying glass over a map. Simultaneously, the magnified version of the defined portion is displayed, whether being displayed over the defined portion or separately or partially separately from the unmagnified map. As the magnifier is moved over the unmagnified map, smoothly changing the defined portion, the magnified version smoothly changes accordingly, to display a smoothly changing magnified version which tracks and corresponds with the defined portion.

As described above, in certain embodiments, the unmagnified map is displayed, or at least partially displayed, simultaneously with the magnified version. As such, a user is provided with the ability to see where the magnifier is on the unmagnified map as the magnifier smoothly moves over the map. The user can also, of course, view the magnified version at any time, conveniently being able to perceive, by reference to the unmagnified map including the magnifier, the location on, or the portion of, the unmagnified map that corresponds to the magnified version. The above-described embodiments, via the fluidly movable magnifier and corresponding magnified version, provide internal navigation within the unmagnified map.

In some embodiments, the magnifier can be replaced with any indicator of a portion of a mapable area of any sort, and the magnified version can instead be any more detailed version of the mapable area. As just one of many potential applications, in some embodiments the invention provides internal navigation within a Web page, whereby, for example, a magnifier can be moved over features such as text, icons, images, or other representations on the Web page, to visually define such features, causing simultaneous display of views which correspond to the defined feature or features, which views can be, in varying embodiments, for example, magnified or more detailed views of the defined features, or other views which provide information associated with the defined feature or features.

Similar to providing for the display of item information that is associated with the position of a position indicator without a magnification feature as discussed above, the invention provides for the display of item information associated with the magnified map part or designated by a magnifier.

Descriptions herein of the relationship of displayed item information and the position of a position indicator apply to embodiments that include or do not include the magnifier feature and/or a magnifier unless indicated otherwise or by the context. Displayed item information changes to correspond to item information related to a re-positioned position of a position indicator. Displayed item information may change with, and track, movement of the position indicator, and/or displayed item information may change for each new stationary position of the position indicator. The associated item information may be displayed automatically or in response to an input such as a mouse operation (e.g., point and click or drag and drop) or keyboard entry. For example, new item information corresponding to the position of the position indicator on the map is displayed after the position indicator remains stationary at a new location for a given time.

The invention also provides for movement of the position indicator to the associated position on the map in response to selection or input of item information. Choosing an entry or listing, e.g., in a categorical directory, causes the position indicator to move to the appropriate location on the map, and conversely, positioning the position indicator on the map causes one or more of the listing of items related to the categorical directory to be displayed.

Examples of categories include those typically found in a telephone yellow pages book or electronic listing, e.g., food stores, drugstores, post offices, automobile rental companies, restaurants, museums, theaters, etc. Categories may also include items not typically found in a telephone yellow pages book, such as parks, points of interest, items in tourist guides, etc. for example. In the preferred embodiment, item information for a position map is contained in a character-based or text database, and graphics for the map is contained, e.g., in conjunction with a graphic file or files.

In one embodiment, two graphics files of maps are displayed; a "magnified view" and an "unmagnified or normal view", the magnified view being, e.g., four times the size of the unmagnified view. In addition, the system also displays item information associated with these views. By using the position indicator's coordinates to index item information within a text and/or character-based and/or graphics and/or image database, specific item information tagged to regions of the magnified view (and indirectly to regions of the unmagnified view) is displayed to the user when the cursor enters regions of the unmagnified view (by simple index look-up or other text retrieval method). Conversely, if the user selects specific displayed item information, the system retrieves and displays the graphical information relating to the region associated with the item information (e.g., by placing the magnifier at the relevant location on the unmagnified view and displaying the corresponding magnified view). Thus, item information can be retrieved and displayed by selecting a region of the unmagnified view, and a region of the unmagnified view (and the corresponding magnified view) can be retrieved and displayed by selecting specific item information. Further, in one embodiment the entire unmagnified map is displayed, but only a portion of the magnified map is displayed at a time. Additionally, the portion of the magnified view displayed is circular with a mask revealing the magnified area corresponding to the unmagnified area under the magnifier (i.e., the magnified view is based on the ratio of the maps' sizes—e.g. four to one).

Alternatively, a single graphic file can be stored, and scaling can be used to obtain a larger or smaller image than the one stored in the graphic file.

Users are, therefore, able to simultaneously view item information associated with regions on the unmagnified and/or magnified map (such as contact information relating to buildings, an image of the buildings or a related person or persons), and link to a web site with a mouse click. In embodiments including the magnifier feature, the graphic information may be viewed magnified together with the associated item information. Alternatively, users can explore a city by category (e.g., restaurants, schools, etc.) and view the location and/or map part (magnified and/or normal) and relevant information associated with each listing under the category.

A feature of the invention is associating a hyperlink with an image, such as a building, which provides the ability to access selected information or a web site associated with the building (or its occupants) by clicking (or double-clicking) an image (magnified or normal or unmagnified) of the building, or by clicking (or double-clicking) an associated item information portion. In the preferred embodiment, a listing can be selected, e.g., by mouse clicking, either the graphical representation of the listing on the map or a item information listing, to activate a hyperlink to further information provided for or about the listing. For example, the hyperlink can be a URL, and mouse clicking can cause an Internet-enabled device to request the web page represented by the URL. This hyperlink is provided as all or part of the item information associated with the listing.

In one embodiment, moving objects appear in the unmagnified view and/or in the magnified view, and preferably in both. In a preferred embodiment, a moving object displayed in an unmagnified view will have a similar appearance and movement in a magnified view. The objects may additionally display messages to the user and/or include advertisements. The moving objects can be in any image and may include images of modes of transportation (e.g., planes, hot air balloons, cars, etc.), people, animals, or objects (e.g., a baseball hit outside of a stadium). Each moving object is implemented as a sprite (i.e., instances of media elements) through algorithms that generate points in lists (i.e. x/y coordinates) that make up location paths that the balloons, blimps, etc. are programmed to follow.

The invention also provides for the display of the map in perspective and in a distinctive style of illustration. Some other style of illustration or conventional two-dimensional bird's eye view of, e.g., the community could be used in an alternative implementation of the invention.

The invention also provides methods and systems for improving the effectiveness of advertising. Unlike banners and other forms of advertising that are currently being used on web sites, these ads are naturally blended into the map's scenery and can even potentially mimic advertisements posted at "actual" locations. For example, if the Burnett Group posted an advertisement in Times Square during June 2001, the company could also post the same advertisement at the Times Square location on an electronically displayed map during that same time period. Accordingly, there are a variety of ways that companies can advertise on an electronically displayed map e.g., billboards, moving objects, etc.—that are effective from a marketing standpoint and engaging from a user's perspective. One method provided by the invention comprises including item information at a plurality of locations on the electronic representation relating to a product or service to be advertised, in response to user selection of a location on the electronic representation or additional information as described herein, providing additional information or an indication of item information, as described herein, having the advertising. The additional information provided in response to user selection is preferably presented outside of and simultaneously with the electronic representation of the area. Another advertising method involves moving an image over the electronic display of the map over the map and providing advertising to move with the image. The moving image and associated advertising can also be provided in the advertising method described above. The methods preferably also include arranging for a financial benefit for presenting at least one of the item information and the additional information. The financial benefit may be remuneration to a party who provides advertising that is accessible for viewing by appropriate persons.

Advertising can be sold, for example, by a map provider, at fixed locations, or in connection with a moving object. In some embodiments, a map provider is provided with benefit, such as a fee, to include an animated image providing advertisement, the benefit being provided, for example, by an entity with an interest in having the advertisement presented. Different fees can be charged depending upon circumstances. In addition, advertisements can be related to for-profit or not-for-profit enterprises or causes.

The invention also provides a business method in which advertising is presented on a map and the sponsor of the advertising is charged a fee for the advertising. The advertising may be displayed in a selected stationary location or locations on the map, e.g., on a billboard or sign, or on a moving object, e.g., a moving graphic representation such as a hot air balloon, or blimp, or airplane moving in any selected direction relative to the map, or boat moving on a body of water (if the map includes or borders on a body of water), or a vehicle or pedestrian moving on streets or highways on the map, etc. In various embodiments, advertising may be static, dynamic and/or animated (changing images and/or text and/or multimedia), accompanied by sounds and/or music. Different fees may be charged depending upon the location of the advertisement, size of the advertisement, the time the advertisement is to run, etc. For example, higher fees are charged to the more frequented areas, or higher fees are charged to advertise at a building, e.g., by the building's main tenant, etc. Also, higher fees can be charged to advertise a location in the same time period in which an event is occurring at the location, etc.

Similarly, the categorical directory could contain display advertising, which could itself take advantage of multimedia possibilities, such as animation, music, sound, voice-overs, broadband streaming audio and video, film clips, etc.

The following examples illustrate the advantages of the invention. Upon selection or input of the category "theaters", a list of theaters within the geographic area represented by the displayed map will be displayed. Selection of a theater from the list will cause the position indicator to move to the area in which the theater is located, and that area will also be displayed magnified. Thus, a listing selected from a category directory causes the position indicator to move to the listing's location on the map, and the associated area to be displayed magnified. In addition, a person (i.e., a "user") working, living, or visiting in or near a geographic area may want to know where he or she may purchase a gift. The user may want to determine what stores are within a three-block radius of his or her office, home or hotel. After accessing the relevant map, the user may simply move the position indicator around the area of the interactive map where he is located and view images of all of the stores and associated item information. As the position indicator is moved, item information relating to buildings within the highlighted area is simultaneously displayed for the user. After exploring an area of interest, a user may select a site to visit for the purpose of selecting a gift to purchase. At this point, the user may not have decided on a particular gift, but has decided that a store is likely to have the type of article that he or she may be interested in purchasing.

On the other hand, if the user has a specific gift in mind, such as personalized stationary, the user can access the appropriate category (e.g., "stationary"), view a list of stores offering stationary in the geographic area, and select a store of interest, e.g., stores offering stationary such as "City Stationers." Once the user clicks on "City Stationers," the position indicator moves to the store's location on the map. The user will then be able to see where the store is located relative to his or her location, and all relevant information about the store (e.g., contact information).

Other uses include, for example: tourists interested in visually exploring a city before deciding upon an itinerary, someone in need of medical care interested in finding the hospital closest to their location and the hospital's emergency information, someone interested in moving to a city who would like to find the names and locations of all real estate agents within a ten block radius of a specific high school, etc. The list of potential uses is essentially limitless.

Furthermore, the invention can provide users with a tremendous variety of information. For example, users can simultaneously obtain information regarding: the location of businesses and their contact information and web sites, the location of public transit services and their hours of operation, the location of hospitals and the emergency numbers, the location of parks and their available facilities and hours of operation, etc. In addition, animation, sound, and other added enhancements can be added to the site.

In alternative embodiments, graphic information may represent any region, e.g., cities, rural regions, bodies of water, areas in space, etc. Moreover, the text information may contain any information associated with any part of the region. For example, alternative implementations may include additional categories such as parks, hospitals, famous landmarks, subway stops, etc. Further, alternative embodiments may include images associated with any region. For example: images of animals may be displayed on a map showing where the animals live or are located in a zoo or a forest; similarly, images of U.S. presidents or movie stars may be displayed on a map of cities (or a city or area) associated with the Presidents or movie stars, etc. For example, images of movie stars may be displayed on a map of the Hollywood area. Moreover, the item information associated with these images may contain any information associated with the images (e.g., information about animals, the term of each president, films the movie stars appeared in, etc.).

Although the invention is mainly described in connection with geographical area representation such as maps or diagrams of geographic locations, and persons, places and things and information associated therewith, "area representation" is meant in a broad sense. For example, a printed circuit board with electronic components thereon can be considered an area representation, and information related to the electronic components or circuit parameters, etc., can be associated with the location of the electronic component. Movement of a position indicator and/or a magnifier could provide access to this information, as described for maps, and could provide magnified views, as described for maps. "Area representation" can be extended to layers of integrated circuits, or any appropriate object, assembly or topography having area, including, for example, three dimensional objects, and whether or not relief is also represented with any area. Thus, celestial representations are also encompassed within the term "area representation" even though celestial bodies area separated by three dimensional spaces. In such an embodiment, a magnifier feature can provide a detailed view of a celestial body while related information is displayed.

Furthermore, in some embodiments, the invention can include two or more simultaneously displayed area representations, each having an associated displayed detailed or magnified view. Two magnified views, each associated with a portion of each area representation, can be used, for example, to compare details or portions of the two or more area representations.

The invention may be implemented with many features in addition to those described herein. For example, a search function can be provided which extends beyond a single map or area representation. Thus, a map associated with the desired information can be located. Also, many variations on navigation and information drilling can be provided. For example, a first mouse click at a location may provide item information and a double mouse click may activate a link to a URL. Further, mouse clicking may activate a multimedia display (song or video clip). For example, mouse clicking a billboard can provide multimedia advertising.

Multimedia and other engaging presentations can be utilized in conjunction with the interactive area representation of the invention. For example, such presentations can include broadband streaming audio and video, animation, film clips, etc. Such presentations can be simply presented to a user or can be user-interactive. The presentations can be activated by various occurrences, such as the user clicking on a feature in a magnified or unmagnified view, or by simply moving a magnifier to a certain portion of an area representation or over or near a particular feature. Alternatively, such presentations can be randomly generated or otherwise generated independently of user input.

BRIEF DESCRIPTION OF DRAWINGS

The invention is illustrated in the figures of the accompanying drawings which are meant to be exemplary and not limiting, in which like references are intended to refer to like or corresponding structure or functions, and in which:

FIG. 2 is text file that includes coordinates on a magnified view of a map;

DESCRIPTION OF PREFERRED EMBODIMENTS

Figure 1:
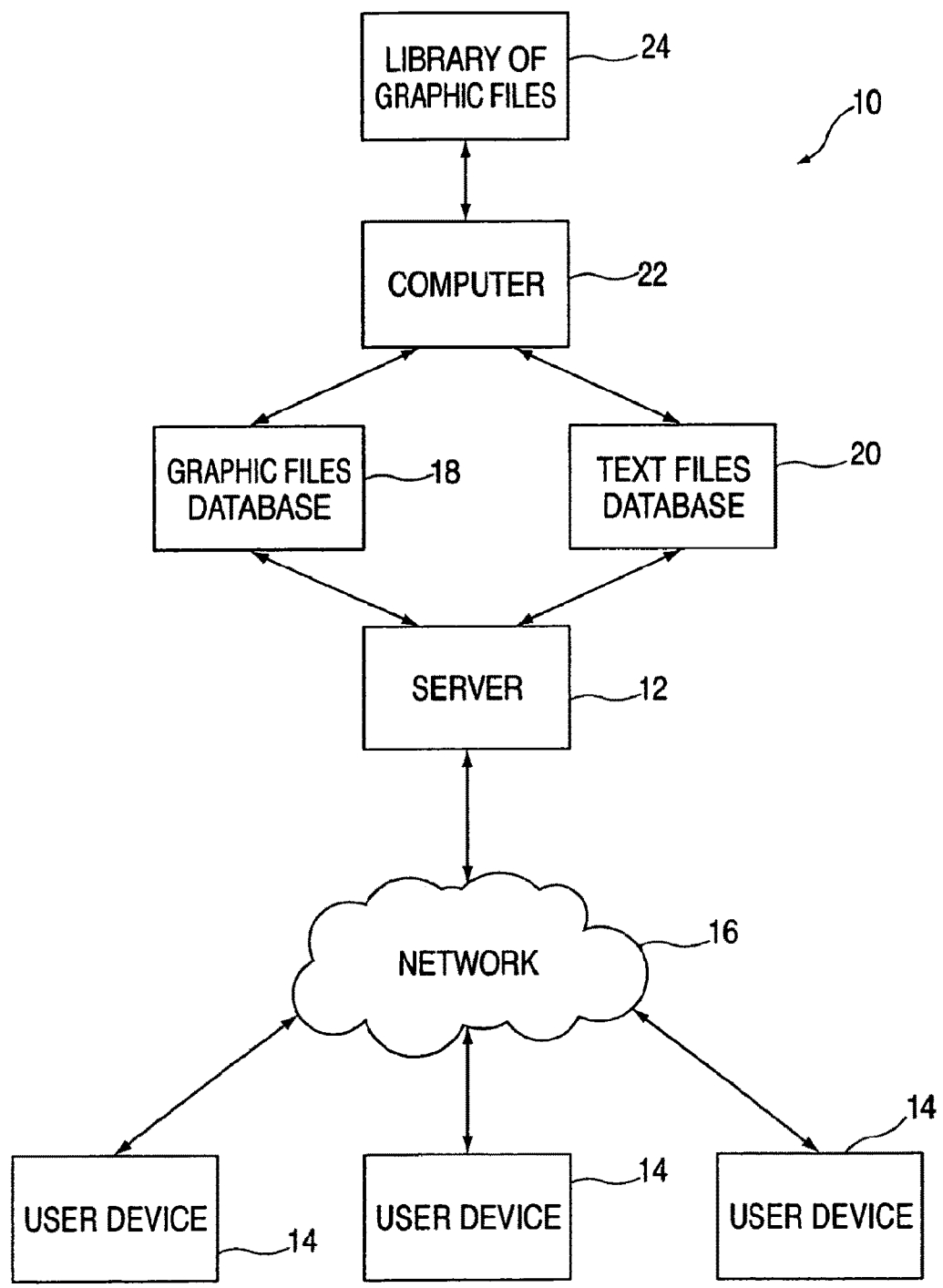
FIG. 1 is a block diagram of a system according to the invention for electronically presenting inventive interactive maps and information.

Maps (and other area representations, as discussed above) are provided in accordance with the preferred embodiment of the invention over the Internet for electronic display using appropriate devices such as a personal computer (including equivalent devices for the purposes of this invention), PDA, any type of web enabled TV, etc. However, maps (and other area representations) may be provided in accordance with the invention on stand-alone devices not connected in or to a network, such as personal computers, or devices connected to an intranet, LAN, WAN, etc. In addition, broadband or other high speed Internet access can be utilized.

While the discussion below focuses on maps and an Internet implementation of the invention, the invention is not limited to maps or an Internet implementation, and those of skill in the related technology field(s) can provide other implementations of the invention from the disclosure herein without undue experimentation. For example, the invention can be implemented using systems such as or including kiosks, cellular telephones, personal digital assistants (PDAs) or other portable or handheld computers, notebook or laptop computers, or other computerized systems or devices. In some embodiments, the invention is implemented utilizing a kiosk which can be completely stand-alone and include all necessary databases as described herein, or a kiosk which accesses remote databases, for example, through wireless communications. A kiosk according to some embodiments can include a touch sensitive screen for user interface, which can be, for example, stylus-based or finger touch-based, as known in the art. In addition, the invention can be practiced using cellular telephones, which can, for example, have wired or wireless Internet access, and which can have navigational or directional controls enabling user interface with and selection from a display. Furthermore, the invention can be implemented utilizing storage media including disks, CD-ROM, DVD or other storage media and systems. In some embodiments, the invention is used for educational or instructional purposes, such as to educate as to geography.

According to other embodiments, the invention may be implemented using an interactive television system. Such a system may include, for example, one or more user computers or terminals, a head end content distribution center comprising or in communication with at least one computer and one or more databases containing information such as map location, actual location text and graphics information. A set top box, such as those manufactured by Scientific Atlanta and known to those of skill in the art, is one example of a user computer or terminal for two-way interfacing with the head end. The set top box can itself be a computer, or can communicate with remote computers, such as computers at the head end distribution center. A display device connected to the user terminal can be configured to present the map and other areas which can contain graphics or text. In some embodiments, a television remote control device having screen navigational capability, such as can be provided, for example, by directional arrow buttons and other buttons or operational features on the device, may be used to navigate or provide input or selection in accordance with the present invention. The remote control device can be used to navigate between, select, provide a query, or provide input associated with map locations, item information, or other text or graphics information. Furthermore, the remote control device can be used to position or dynamically move a position indicator, such as a magnifier, to or between positions on the map. The remote control device can be used with interactive television to perform operations similar or identical to those that can be performed in other embodiments of the invention with a mouse or other device, as is described herein.

Referring to FIG. 1, a system 10 implementing the invention includes a server 12 that communicates with user devices 14 over a network 16. Graphic information from which map displays are provided is stored in a graphic files database 18, e.g., in graphic files such as compressed GIF files, and text information from which item information and advertising are provided are stored in a text database 20, e.g., in text files. A computer 22 may be used to provide and edit graphic and text files for databases 18 and 20. A library 24 of graphic files may be provided, from which graphic files are stored in database 18 either in edited or unedited form.

In the preferred embodiment, the network 16 is the Internet, the server 12 is a web server, and the user devices 14 are devices which support a web browser and are capable of accessing web sites over the Internet, such as personal computers. Using standard web-browsing software, a user device 14 may connect to the web server 12 using any device capable of supporting a web browser (including, but not limited to, personal computers, PDAs such as Palm Pilots, and pocket PCs and internet-enabled cellular phones, etc.). In one embodiment, the web server 12, using standard web-serving software, sends a Shockwave executable application and relevant graphics and text files to the user's device 14, which in this embodiment includes a web browser with a Shockwave plug-in that is capable of executing the Shockwave application. The use and operation of the Shockwave executable application is known by those of skill in the related art.

The graphics and text files in databases 18 and 20 are maintained by conventional graphics and text editing software in computer 22. Using this software, the graphics and text files can be updated, and individual listings can be deleted and added as necessary. The library of graphical files can store images of buildings, streets, parks, etc., and these can be used in known manner to construct map graphics files stored in a compressed format such as GIF in graphic files database 18. The text file contains: categories and lists of public and private entities; each entity's address, phone number, fax number, and web site hyperlink; and each entity's coordinates relative to the GIF file of the magnified map (FIG. 2).

Figure 3:
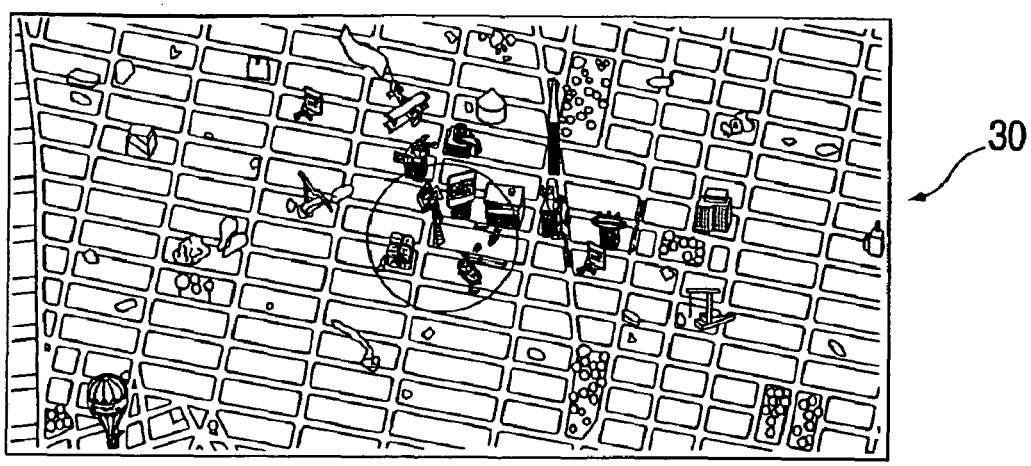
FIG. 3 illustrates an unmagnified view of the map with a magnifier at a given location on the map.
Figure 4:
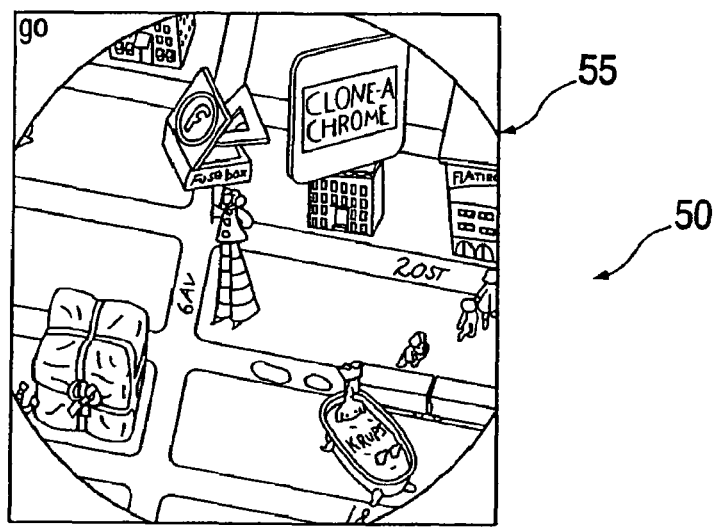
FIG. 4 illustrates a magnified view corresponding to the portion of the map within the magnifier shown in FIG. 3.

In this embodiment, the web browser on a personal computer and the Shockwave executable application display, an "unmagnified view" 30 of the concerned map (FIG. 3), and a section of a "magnified view" 50 (FIG. 4), from two GIF files. Accordingly, there are two maps: an unmagnified map (FIG. 3), and a magnified map, of which a portion is shown in a circular window 55 (FIG. 4). In the illustrated embodiment, the magnified view is four times larger than the unmagnified view. (Any suitable magnification can be used.) Further, although there are other ways of importing graphics from the server, in the preferred embodiment graphics remain external to the program file and the application imports a reference to it.

A magnified view, as used herein, is intended to mean any presentation or view that appears magnified with respect to an unmagnified view. For example, in some embodiments, a magnified view presents features, images, text, or other information as larger versions of the features, images, text, or other information presented in an unmagnified view. In some embodiments, a magnified view can include only larger "versions" of features, etc., whereas in other embodiments, a magnified view can include larger "versions" of features, etc., as well as additional detail not included in an associated unmagnified view. Furthermore, in some embodiments of the invention, users can select features, etc. from the magnified view to obtain information associated with such features. It should be kept in mind that the invention also contemplates detailed views other than magnified views, which detailed views are more detailed than associated less detailed views.

In varying embodiments of the invention, different levels of magnification in magnified views can be used. Furthermore, in different embodiments, the level of magnification can be set or scaled automatically depending on the unmagnified view or some other parameter, or can be selected or specified by a user in accordance with a level of detail, magnification, or scaling which is necessary, desired, or most convenient for the user. In the preferred embodiment, the software executed by system 10 was developed in Macromedia director, but it could be implemented in any programming language such as C++ or Java. The system could also be implemented directly in hardware such as in a handheld image/map navigation device. Director utilizes a second quadrant coordinate scheme. Under this scheme, the origin is at the top left corner of the stage (i.e., the presentation window or screen view), x values go from left to right, and y values go from top to bottom, all coordinates are calculated relative to the stage, and the units are screen pixels. (Any x values left of the stage and any y values above the stage are negative values. For example, if a graphic is located to x: 100/y: 100, the graphic will be placed 100 pixels to the right of the left edge of the stage, and 100 pixels down from the top edge of the stage. If the location of a graphic is set to x: −50/y: −50, the graphic will be placed 50 pixels to left of the left edge of the stage, and 50 pixels above the top edge of the stage.) Since only what is placed within the dimensions of the stage will be displayed, if part or all of a graphic is placed off the stage, it does not show when the program is running (Moreover, because the large map is much bigger than the stage in the preferred embodiment, a portion can only be seen at any time within a circular window or mask.)

The coordinates in the text file (FIG. 2) reference the magnified view 50. The first two numbers are the "x" and "y" coordinates for the graphic on the map; the third and fourth numbers are their widths and height. The Shockwave application responds to changes in the location of the position indicator on the unmagnified view by displaying the new corresponding area of the magnified view within the circular mask, and by searching the text file (FIG. 2) to retrieve whatever listing is associated with that new location (using the coordinates on the magnified view). Moreover, when a particular listing is selected, the Shockwave application retrieves further information about the listing and displays that information to the user. Concurrently, the Shockwave application retrieves the coordinates of the selected listing on the unmagnified view (e.g., by referencing the magnified view's coordinates and by dividing the magnified view's coordinates by, in this embodiment, four), and moves the position indicator to the corresponding location on the unmagnified view.

Figure 5:
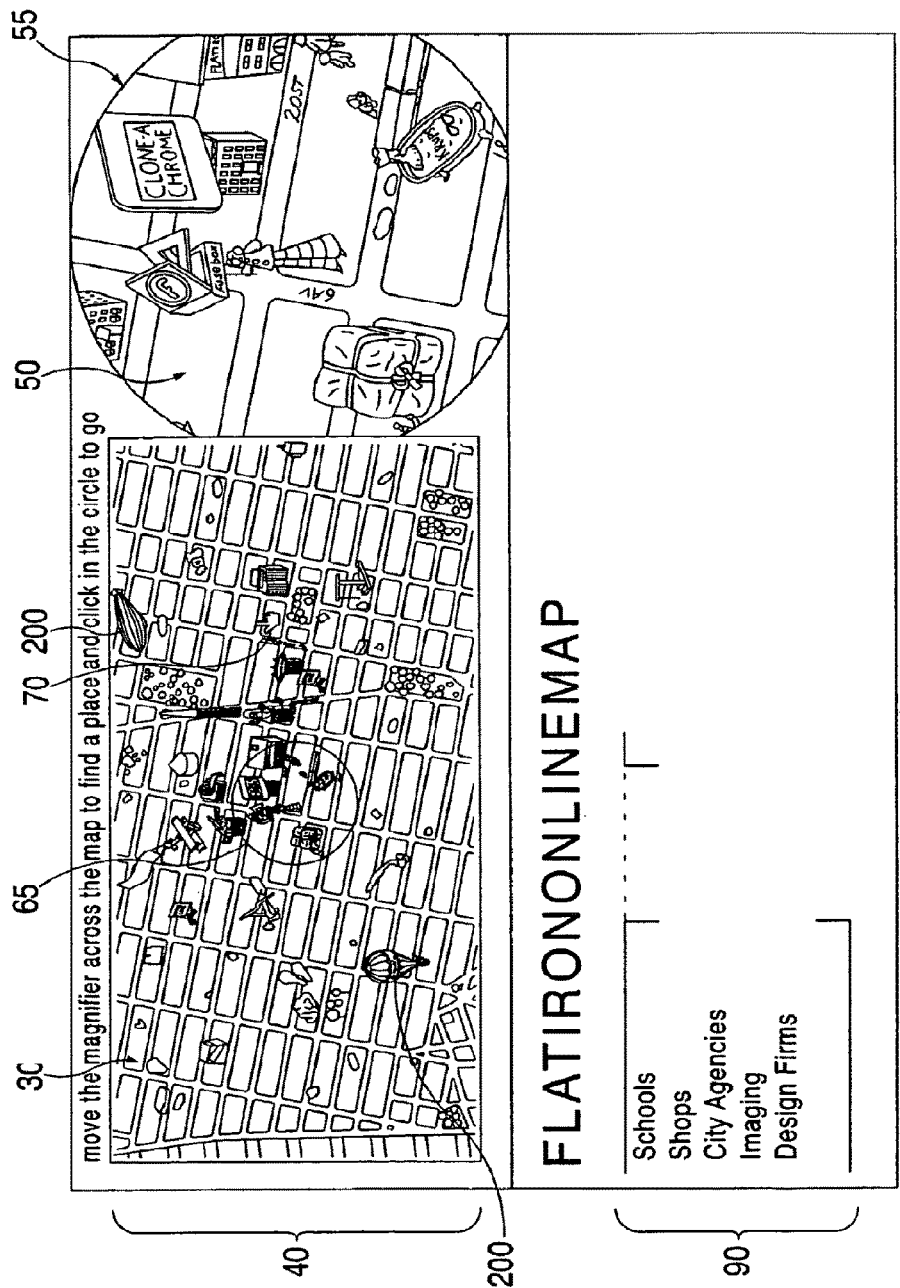
FIGS. 5-9 illustrate electronic presentations of maps, item information and magnified map portions in accordance with the invention.

With reference to FIG. 5, a part of the magnified view 50 obtained from one GIF file is displayed which corresponds to the area on, at, near, adjacent to or surrounding the coordinates of the magnifier 65. In the disclosed embodiment, the Shockwave application displays from another GIF file the entire unmagnified view 30 of the concerned geographic area (e.g., the city's map) on the left side 40 of a browser window. In addition, the Shockwave application displays category listings in a text area 90. The magnifier 65 highlights a geographic area on the unmagnified view, which in this embodiment is a circle. On the right side of the browser window, the Shockwave application displays the part of the magnified view 50 within a circular window 55 that corresponds to the area circumscribed by the magnifier on the unmagnified map 30. The Shockwave application also displays on the bottom portion 90 of the browser window a list of the categories corresponding to categories listed in the text file.

In one embodiment, the magnified view 50 changes in accordance with movement of the position indicator's movement or the dragging of the magnifier 65, i.e., the portion of the magnified view 50 is moved relative to the circular window or mask 55 responsive to the position of the magnifier 65. This is accomplished using scripts. One script is attached to the magnifier and responds when the user clicks the mouse down while the cursor is positioned over the magnifier. The script performs three tasks in response to a mouse click. One, the script sets a variable to true indicating that the mouse is clicked down. Two, it sets a variable—mX—indicating the horizontal distance from the cursor to the x coordinate of the center of the magnifier (x coordinate of the center of the magnifier minus the x coordinate of the cursor). Three, it sets a variable—mY— indicating the vertical distance from the cursor to the y coordinate of the center of the magnifier (the y coordinate of the center of the magnifier minus the y coordinate of the cursor).

In addition, a score script tells the program to loop over and over in the current frame of the score (i.e., the timeline in Director). In each iteration of a loop, the script checks the true/false variable indicating whether the user has clicked down on the magnifier. If the true/false variable is false, the script does nothing. If it is true, the script performs the following tasks: it sets the location of the center of the magnifier to the location of the mouse cursor minus mX and mY. The script then sets a variable to the distance of the center of the magnifier from the left edge of the small map and sets another variable to the distance of the center of the magnifier from the top edge of the small map. It then multiplies these variables by four (in this embodiment) to calculate the equivalent distances for the magnified view and sets the top left corner of the map of the magnified view to the center of the large circular window 55 minus the equivalent horizontal and vertical distances. (For example, if the magnifier is located 300 pixels from the left edge of the small map and is located 250 pixels from the top edge of the small map, the equivalent distances on the magnified view would be calculated as 1200 and 1000 respectively.

Since in the preferred embodiment, the center of the circular magnified view's window (or mask) is located x: 600/y: 150, the top left corner of the magnified view map would be set at x: 600-1200/y: 150-1000, or x: −600/y: −850.) By looping very quickly and running this score script over and over again, the program will repeat the above calculation hundreds of times if the user's mouse button is clicked down for a period of time. Accordingly, the magnifier 65 and the magnified view within windows 55 snap from one discreet point to another very quickly which gives the impression of sliding movement. Furthermore, if the user clicks anywhere on the unmagnified view outside of the magnifier 65, e.g., at the location of the position indicator 70 in FIG. 5, the magnifier will snap to the location of the user's click (FIG. 6), and the position of the magnified view within the large, circular window 55 will be adjusted accordingly. The position indicator 70 will then appear in the magnifier, as shown in FIG. 6.

The system 10 also displays text associated with the various images (e.g., buildings) on the unmagnified and magnified views by using the position indicator's coordinates. Regions of the unmagnified view are indirectly tagged to specific text (vis-à-vis the magnified view's coordinates which are directly tagged to the text) which appear when the cursor enters these regions (FIG. 2). For example, a region of the unmagnified view bounded by the coordinates 329, 111, 24, 11 (using the magnified view's coordinates 1314, 444, 95, 45 and dividing by four) is associated with the item information pertaining to the Burnett Group. Thus, whenever the position indicator is at or near this area on the unmagnified view, the item information associated with that region is retrieved, by simple index look-up or other text retrieval method. Other region shapes such as circles are also possible.

The magnifier 65 used in the preferred embodiment is circular in shape and resembles a conventional magnifying glass. In the alternative embodiments, it could assume any shape that enables the user to identify a part of the map. Furthermore, in the preferred embodiment the user employs a mouse to move the magnifier by moving the cursor over the magnifier, holding down the mouse button, and moving the mouse to drag the magnifier, or by pointing and clicking at a desired location. Alternative embodiments include the use of any device capable of moving the position indicator, such as keypad, touch device, digitizer or touch screen, for example.

Figure 6:
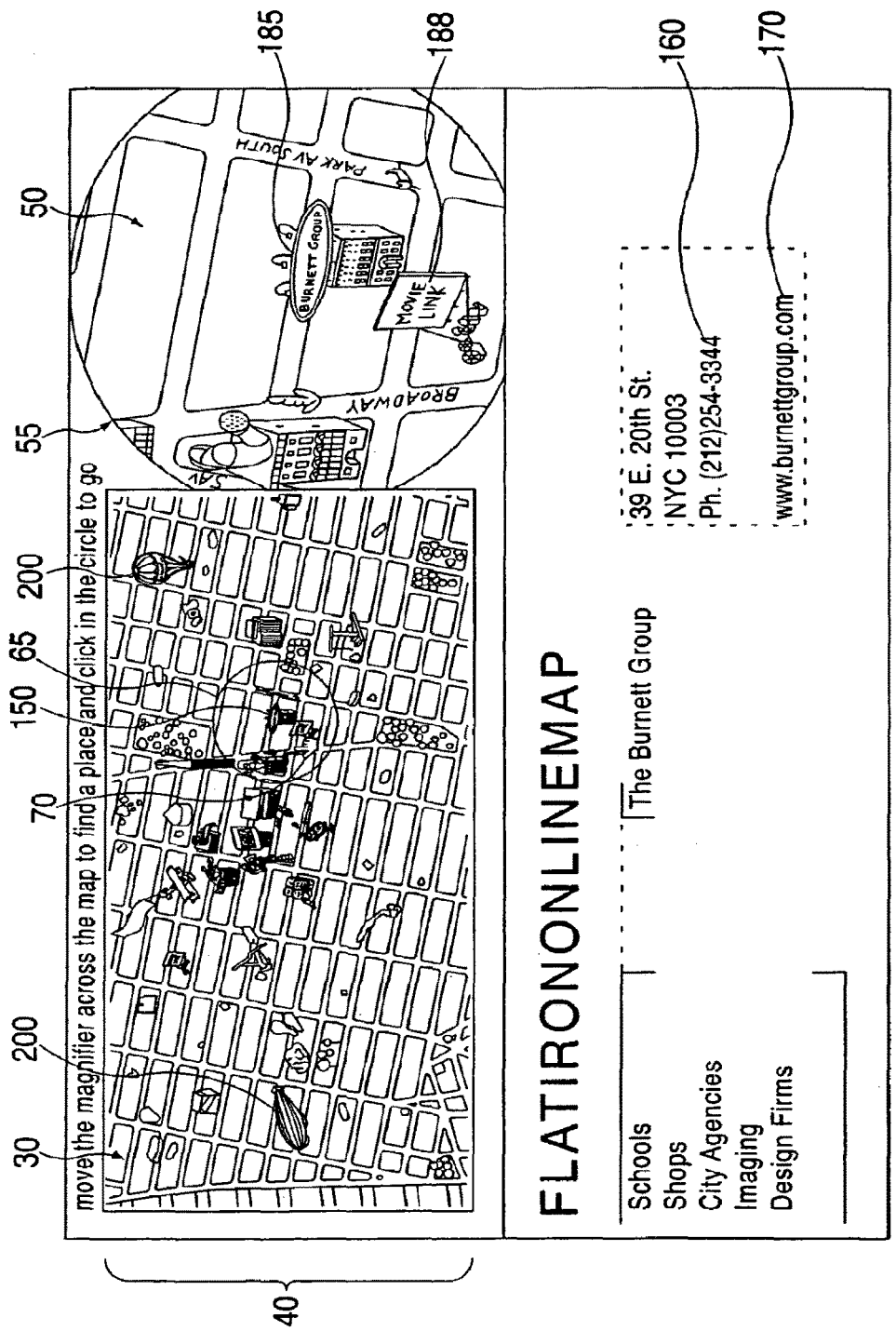

For example, in response to a mouse click with the position indicator 70 located as shown in FIG. 5, the system 10 activates a mouse "point and click" operation and provides the display shown in FIG. 6. In response to a mouse "click and hold" mouse operation with the position indicator 70 located within the magnifier 65 in FIG. 6 activates a mouse "drag and drop" operation with which the magnifier 65 (FIG. 6) the system 10 can be dragged and dropped to the position shown in FIG. 7.

In the preferred embodiments, the magnifier 65 is implemented by two sprites: one is a yellow circle which gives it visual definition, the other is a circular bitmap. The circular bitmap is given an ink effect called AddPin which adds the pixel colors of the circle to the pixel colors of the area of the map on which it lies. Accordingly, the resulting pixel colors are brighter than the colors of the map. When the user clicks down within or on the yellow circle, two variables are set to the horizontal and vertical distances between the horizontal and vertical coordinates of the mouse location and the horizontal and vertical coordinates of the top-left corner of the bounding box for the yellow circle. Another variable is set to true indicating that the magnifier has been clicked down on. Whenever the mouse is released, this variable is set to false. While the program is running, this variable is constantly checked. While the variable is true, the magnifier is moved to the horizontal and vertical coordinates of the mouse minus the two variables mentioned above. This ensures that the magnifier stays in place regardless of where the user clicks within it, rather than snapping to the location of the user's click.

If the user clicks the position indicator on any part of the map outside the circle, the magnifier is moved with its center at the position of the position indicator.

Once the user moves the magnifier 65, the Shockwave application displays item information 160 relating to the new location in the item information portion which corresponds to the new position of the magnifier 65. (FIG. 6.) In addition, the area in the magnified view that corresponds to the area indicated by the magnifier is presented in the magnified view 50. Furthermore, the section 50 of the magnified view that is displayed is proportional to the area under the magnifier based on the ratio of areas of the maps (e.g., four to one). Accordingly, whenever the user browses a neighborhood by moving the position indicator relative to the map, the Shockwave application displays the item information and magnified image associated with the magnifier's new coordinates, either per a "point and click" or a "drag and drop" operation as described above.

For example, if the user moves the magnifier to the Burnett Group building 150, the item information associated with the Burnett Group will appear in the item information portion at the bottom of the display 160 and a magnified image of the Burnett Group's building will appear in right side of the display 185 within the circular mask. (FIG. 6.) Furthermore, the user may connect to the Burnett Group's web site by clicking on the web site link 170 in either the item information portion or on the building in the magnified view of the Burnett Group 185. In response, the user device opens a new browser window and displays the web page provided by the server at the Burnett Group web site.

In one embodiment, moving objects 200 (e.g., a hot air balloon and blimp) appear in the unmagnified view 30 (FIG. 6) and in the magnified view 50. (FIGS. 7 and 8) as they traverse the map 30. For example, a hot air balloon 200 is shown under the magnifier in the unmagnified view 30 in FIGS. 7 and 8 and in a magnified map portion 50 in FIGS. 7 and 8. The objects may display messages to the user and/or include advertisements. The moving objects can include images of modes of transportation (e.g., planes, hot air balloons, cars, etc.), people, animals (e.g. birds) or objects (e.g. baseball hit outside of stadium). In one embodiment, algorithms are employed to generate the coordinates of the paths that the moving objects 200 (such as the balloon and blimp) are programmed to follow on the maps. The graphics for these objects are separate sprites and their animation is handled by the score script. Each object has two separate lists of points, one defining a path on the unmagnified view and one defining a path on the magnified view.

The script that handles the movement of the magnifier can also handle animation of the balloon and blimp. There are two lists of points for each moving object: one each for the smaller and larger versions. For two moving objects (a balloon and a blimp), there are four lists of points: one for the small balloon, one for the large balloon, one for the small blimp, and one for the large blimp. Each list of points, calculated beforehand, is passed to the score script. Starting with an initial index number which is incremented after each repetition of the score script's loop, points are retrieved from each of the four lists using the index number. The points are x/y pairs and they tell the program where to put the graphics for the balloons and blimps. For example, in the first iteration of the loop, the index number is set to 1. The script gets the number 1 point for each of the lists, and sets the position of the graphics to those points. In the next iteration, the index number is 2. The script gets the second set of points from the lists, and sets the positions of the graphics to those points, etc.

There may be a very slight delay between the passing of the smaller and the passing of the larger sprites within their respective circular areas. This can be caused by a slight lack of precision when using the scaling factor in the algorithm which generates the list of animation points.

Figure 7:
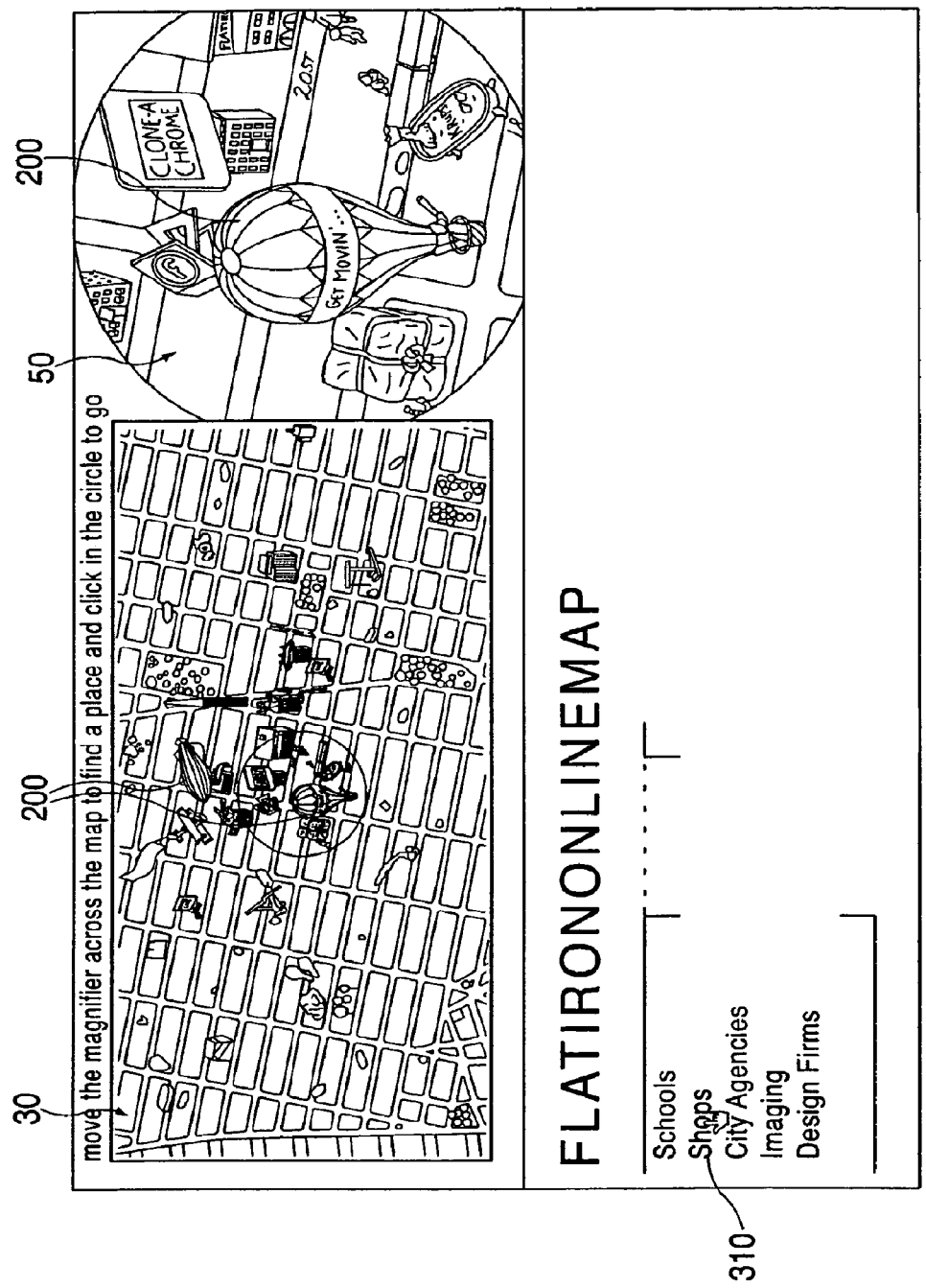
Figure 8:
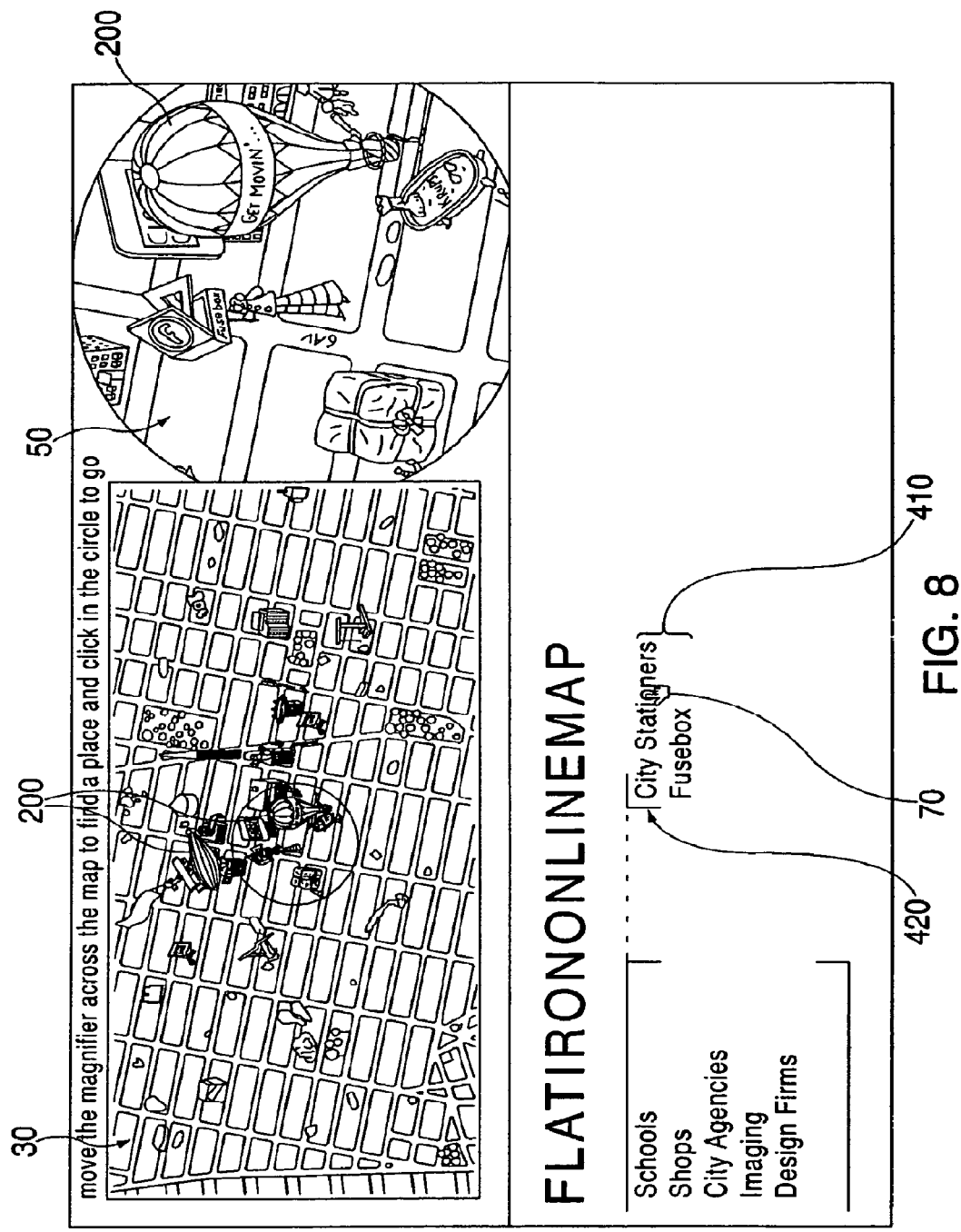
Figure 9:
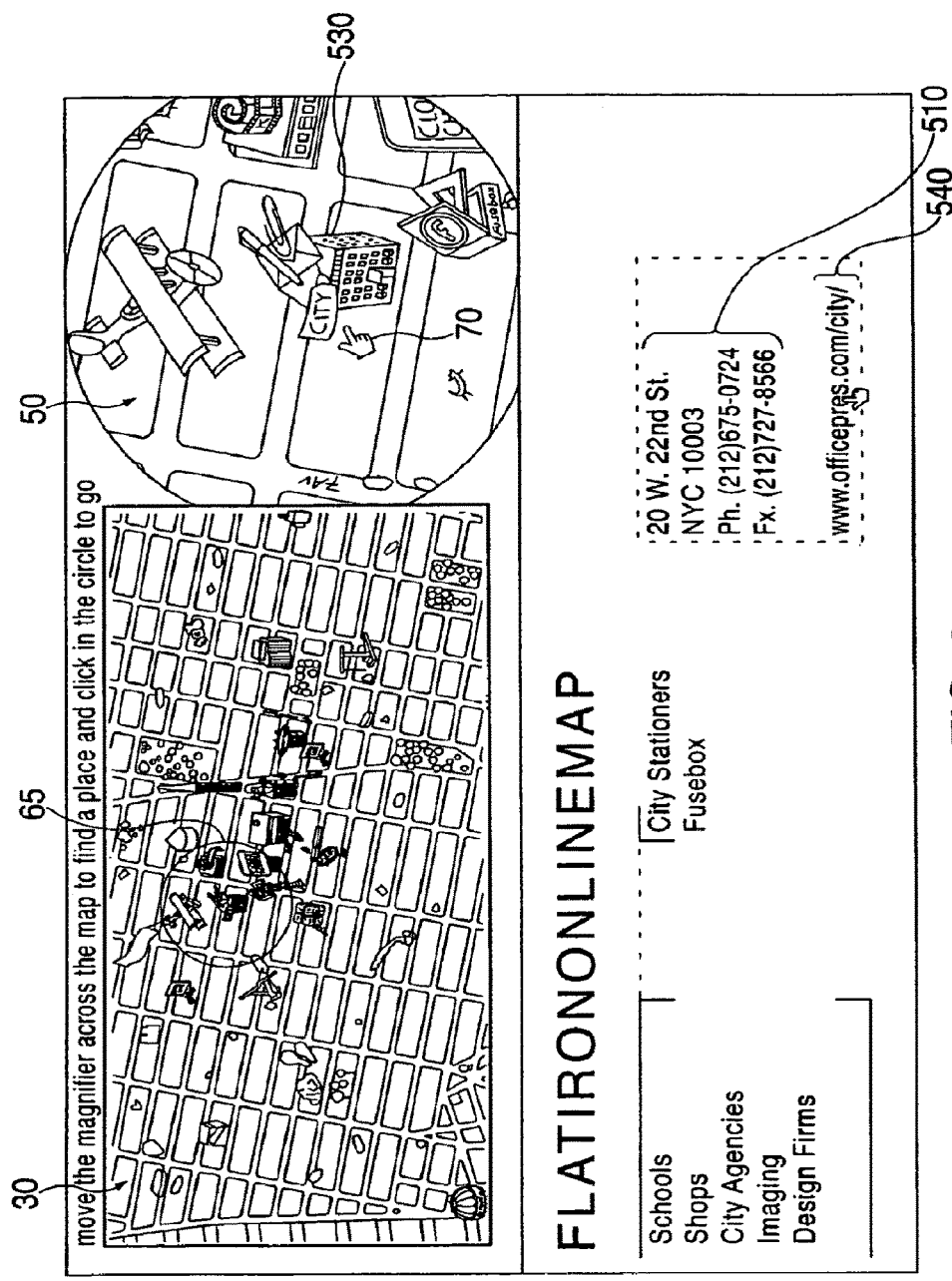

The user may also choose to browse a neighborhood by selecting a category listing from the item information portion. (FIG. 7.) For example, when the user clicks on a category heading 310, the executable Shockwave application searches the text file for business listings under the category (e.g., "city agencies"), and displays the listings 410 (FIG. 8) in the item information portion. The user may then move the position indicator 70 to a particular listing such as "City Stationers" 420 and click. The Shockwave executable application then searches the text database for "City Stationers" and finds and displays item information associated with the listing such as its address, phone number, fax number, and a web site link 510 (FIG. 9). The region on the magnified view 50 associated with the text string is determined by matching the selected string with strings in the region list. When a match is found, then a center point associated with the region is either computed (e.g. by finding the center of a rectangular region), or a stored center point is retrieved and the content in the magnified view is updated. In addition, the Shockwave executable application determines the coordinates of the selected listing on the unmagnified view 30 (by dividing the magnified view's coordinates by four), and positions the position indicator over the City Stationers building in the magnifier 65. The user may then connect to the City Stationer's web site by clicking the position indicator 70 (FIG. 9) on the web site link 540 in the item information portion, or by clicking the position indicator 70 on the City Stationers building graphic 530 in the magnified view 50. (Two position indicators 70 are shown in FIG. 9 for purposes of illustration.)

In the disclosed embodiment, advertising is presented in the form of stationary billboards 188 and moving objects 200 (FIG. 6). In alternative embodiments, advertising can appear in any form that could be associated with a bird's eye view of a region. Advertisements could be presented on moving or stationary subway cars, taxis, planes, boats, etc. While airborne moving objects such as balloon 200 and blimp 200 can follow any path, ground vehicles will move through streets according to any desired path, etc. Advertising can be presented as discussed above and fees can be charged as discussed above.

Animated images can be associated with particular locations or items on an area representation or view, or can be not associated with any presented location or item. In some embodiments, animated images are selected based upon or to appeal to an anticipated set of users of an area representation.

Use of a Shockwave application on user devices distributes processing requirements so that a large number of users can be served from a modestly-powered web site.

In the alternative embodiments, image files may contain maps of any region. For example, the user may be able to view maps of any geographic area of the world, e.g., cities, rural regions, bodies of water, and even areas in space, etc. Moreover, the text file may contain any information associated with an item on a map. For example, alternative implementations may include additional categories such as parks, hospitals, famous landmarks, subway stops, etc. Furthermore, the categorical directory could employ advertising and various multi-media possibilities such as animation, music, sound, and voice-overs.

Furthermore, in an alternative implementation, a database could replace the text file described above and serve as a source of listings and map's coordinates. In this alternative implementation, the Shockwave application would query the serving machine in order to obtain information.

The invention is also not limited to a particular means of data transmission necessary to move files from a server to a user's device—the method could involve wired or wireless Internet access, cable, phone, satellite, or DSL.

While the invention has been described and illustrated in connection with preferred embodiments, many variations and modifications as will be evident to those skilled in this art may be made without departing from the spirit and scope of the invention. As mentioned, the invention has application to many variations of maps, and to area representations of many things in addition to maps. The invention is thus not to be limited to the precise details of methodology, construction or application set forth above as such variations, modification are and applications intended to be included within the scope of the invention.

What is claimed is:

1. A non-transitory computer readable medium or non-transitory computer readable media including computer code that causes at least one computer to perform a method of providing an interactive area representation on a display device, the method comprising simultaneously displaying on the display device:

the area representation;
a highlighted portion of the area representation indicating a first portion of the area representation that can be positioned on the area representation by a pointing device;
outside of the area representation a magnified representation of the first portion of the area representation represented by the highlighted portion;
information about one or more specific items associated with the area representation on the area representation, on the magnified representation, or both; and
outside of the area representation and the magnified representation additional information about at least one specific item of the one or more specific items, wherein the additional information about the at least one specific item includes user-selectable information;

the method further comprising:
in response to user input to the at least one computer with the pointing device to select user-selectable additional information from the additional information about the at least one specific item, positioning the highlighted portion on the area representation to indicate a second portion of the area representation corresponding to a location on the area representation related to the selected additional information, displaying a magnified representation of the second area representation portion represented by the positioned highlighted portion, and displaying with at least part of the additional information outside the area representation and the magnified representation further information about the at least one specific item;

the method further comprising:
in response to user input to the at least one computer to the area representation with the pointing device, positioning the highlighted portion on the area representation to indicate a third portion of the area representation, displaying a magnified representation of the third area representation portion indicated by the positioned highlighted portion and displaying additional information outside of the area representation and outside of the magnified representation about at least one specific item indicated on the third area representation portion.

2. The computer readable medium or media of claim 1, wherein displaying the information about the one or more items associated with the area representation on the area representation, on the magnified representation or both includes displaying graphical information.

3. The computer readable medium or media of claim 1, wherein displaying the information about the one or more items associated with the area representation on the area representation, on the magnified representation or both includes displaying text information.

4. The computer readable medium or media of claim 1, wherein displaying the information about the one or more items associated with the area representation on the area representation, on the magnified representation or both includes displaying a link to other information.

5. The computer readable medium or media of claim 1, wherein the pointing device can continuously move the highlighted portion on the display of the area representation.

6. The computer readable medium or media of claim 1, wherein the method further comprises moving an image with respect to the area representation including through the highlighted portion and through the magnified representation of the highlighted portion, the image being represented magnified in the magnified portion as compared to the image moved with respect to the area representation.

7. A method of providing an interactive area representation on a display device with at least one computer, the method comprising simultaneously displaying on the display device:
  the area representation;
  a highlighted portion of the area representation indicating a first portion of the area representation that can be positioned on the area representation by a pointing device;
  outside of the area representation a magnified representation of the first portion of the area representation represented by the highlighted portion;
  information about one or more specific items associated with the area representation on the area representation, on the magnified representation or both; and
  outside of the area representation and the magnified representation additional information about at least one specific item of the one or more specific items, wherein the additional information about the at least one specific item includes user-selectable information;
  the method further comprising:
  in response to user input to the at least one computer with the pointing device to select user-selectable additional information from the additional information about the at least one specific item, positioning the highlighted portion on the area representation to indicate a second portion of the area representation corresponding to a location on the area representation related to the selected additional information, displaying a magnified representation of the second area representation portion represented by the positioned highlighted portion, and displaying with at least part of the additional information outside the area representation and the magnified representation further information about the at least one specific item;
  the method further comprising:
  in response to user input to the at least one computer to the area representation with the pointing device, positioning the highlighted portion on the area representation to indicate a third portion of the area representation, displaying a magnified representation of the third area representation portion indicated by the highlighted portion and displaying outside of the area representation and outside of the magnified representation additional information about at least one specific item indicated on the third area representation portion.

8. The method of claim 7, wherein displaying the information about the one or more items associated with the area representation on the area representation, on the magnified representation or both includes displaying graphical information.

9. The method of claim 7, wherein displaying the information about the one or more items associated with the area representation on the area representation, on the magnified representation or both includes displaying text information.

10. The method of claim 7, wherein displaying the information about the one or more items associated with the area representation on the area representation, on the magnified representation or both includes displaying a link to other information.

11. The method of claim 7, wherein the pointing device can continuously move the highlighted portion on the display of the area representation.

12. The method of claim 7, wherein the method further comprises moving an image with respect to the area representation including through the highlighted portion and through the magnified representation of the highlighted portion, the image being represented magnified in the magnified portion as compared to the image moved with respect to the area representation.

13. A system for providing an interactive area representation on a display device, the system comprising:
  at least one computer;
  a display device;
  the at least one computer being programmed to receive user input from a pointing device, and the at least one computer being programmed to provide on the display device a display that simultaneously comprises:
  an area representation;
  a highlighted portion of the area representation indicating a first portion of the area representation that can be positioned on the area representation by the pointing device;
  outside of the area representation, a magnified representation of the first portion of the area representation represented by the highlighted portion;
  information about one or more specific items associated with the area representation on the area representation, the magnified representation or both; and
  outside of the area representation and the magnified representation additional information about at least one specific item of the one or more specific items, wherein the additional information about the at least one specific item includes user-selectable information; wherein
  in response to user input to the at least one computer with the pointing device to select user-selectable additional information from the additional information about the at least one specific item, the at least one computer being configured to position the highlighted portion on the area representation to indicate a second portion of the area representation corresponding to a location on the area representation related to the selected additional information, display a magnified representation of the second area representation portion represented by the positioned highlighted portion, and display with at least part of the additional information outside the area representation and the magnified representation further information about the at least one specific item, and wherein in response to user input to the at least one computer to the area representation with the pointing device, the at least one computer positioning the highlighted portion on the area representation to indicate a third portion of the area representation, displaying a magnified representation of the third area representation portion indicated by the highlighted portion and displaying outside of the area representation and outside of the magnified representation additional information about at least one specific item indicated on the third area representation portion.

14. The system of claim 13, wherein the information about the one or more items associated with the area representation on the area representation, on the magnified representation or both includes graphical information.

15. The system of claim 13, wherein the about the one or more items associated with the area representation on the area representation, on the magnified representation or both includes text information.

16. The system of claim 13, wherein the information about the one or more items associated with the area representation on the area representation, on the magnified representation or both includes a link to other information.

17. The system of claim 13, wherein the pointing device can continuously move the highlighted portion on the display of the area representation.

18. The system of claim 13, wherein the computer is programmed to move an image with respect to the area representation including through the highlighted portion and through the magnified representation of the highlighted portion, the image being represented magnified in the magnified portion as compared to the image moved with respect to the area representation.

* * * * *